Sept. 13, 1938.  H. WYDLER  2,130,257
COUNTING MECHANISM FOR USE IN A LIQUID DISPENSING APPARATUS
Filed Sept. 8, 1936  5 Sheets-Sheet 1
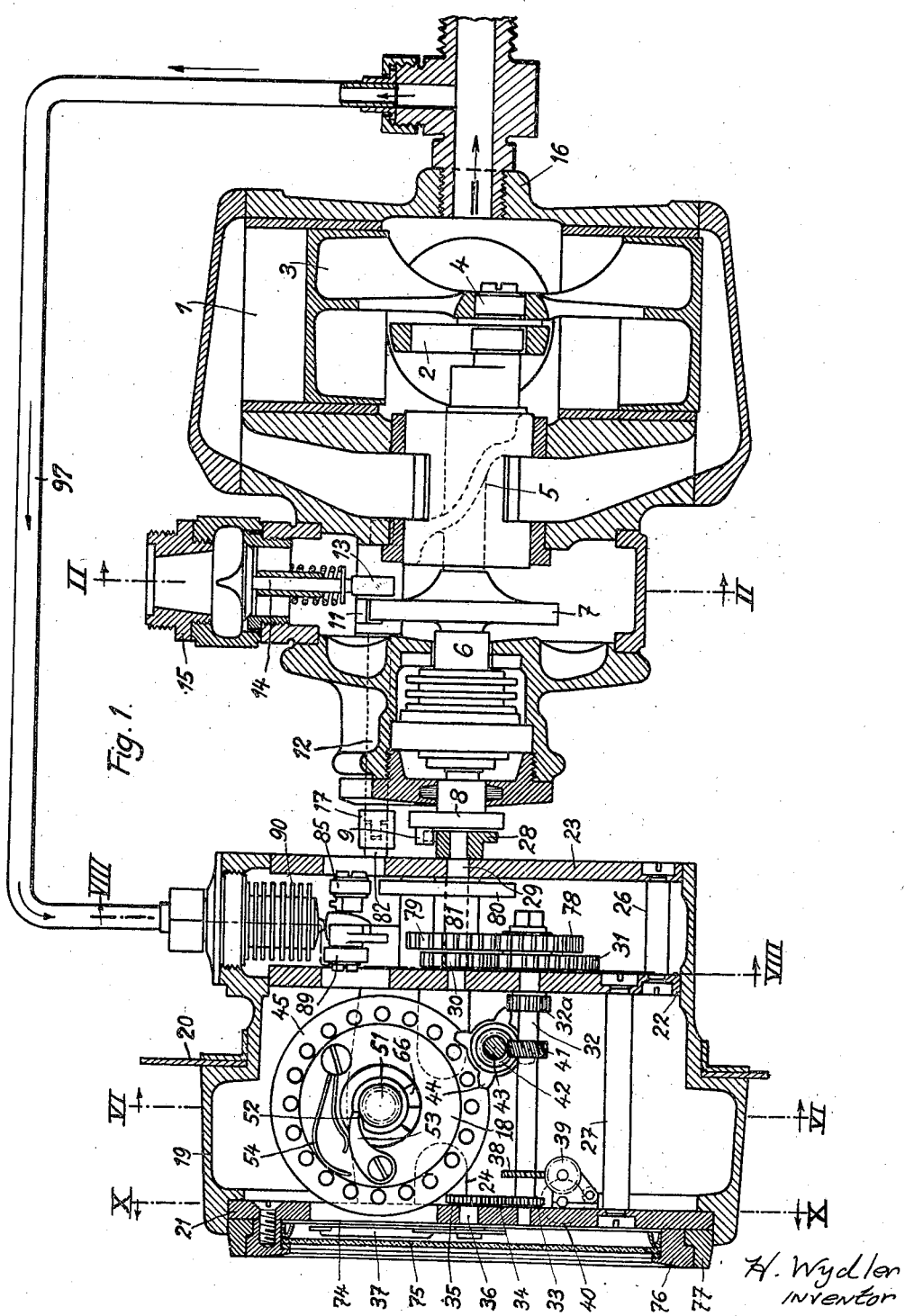

Sept. 13, 1938.   H. WYDLER   2,130,257
COUNTING MECHANISM FOR USE IN A LIQUID DISPENSING APPARATUS
Filed Sept. 8, 1936   5 Sheets-Sheet 2
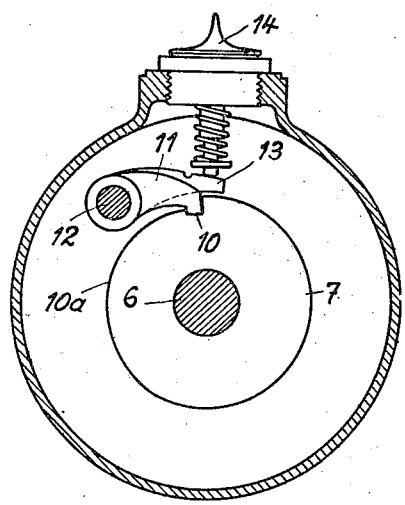
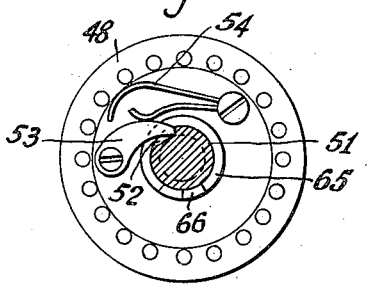
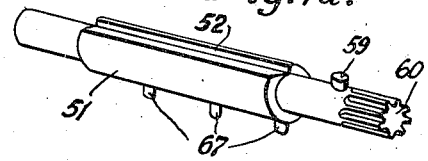
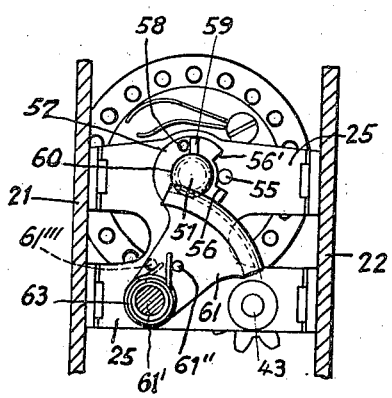

Sept. 13, 1938.  H. WYDLER  2,130,257

COUNTING MECHANISM FOR USE IN A LIQUID DISPENSING APPARATUS

Filed Sept. 8, 1936  5 Sheets-Sheet 3

H. Wydler
INVENTOR

By: Glascock Downing & Seebold
Attys.

Patented Sept. 13, 1938

2,130,257

UNITED STATES PATENT OFFICE 2,130,257

COUNTING MECHANISM FOR USE IN A LIQUID DISPENSING APPARATUS

Hermann Wydler, Bern, Switzerland, assignor to the firm Sauser A.-G., Soleure, Switzerland, a joint-stock company of Switzerland Application September 8, 1936, Serial No. 99,892
In Switzerland September 13, 1935

6 Claims. (Cl. 221—95)

The present invention relates to liquid dispensing apparatus comprising a volume meter combined with a totalizing counter and a counter for individual deliveries.

More specifically the invention pertains to apparatus permitting the stopping of the delivery exactly at the moment when a started measuring unit has been completed and the invention includes a manually operable mechanism associated with the single delivery counter whereby the same may be returned to the zero position.

The appended drawings represent as an example one form of the invention.

In the drawings, Fig. 1 is a sectional view taken on line I—I of Fig. 4;

Figs. 1a and 1b are perspective views of details of the counter;

Fig. 2 is a sectional view taken on line II—II of Fig. 1 illustrating the details of the device for stopping admission of the fluid to the meter;

Fig. 5 is a sectional view taken on line V—V of Fig. 3;

Figure 3:
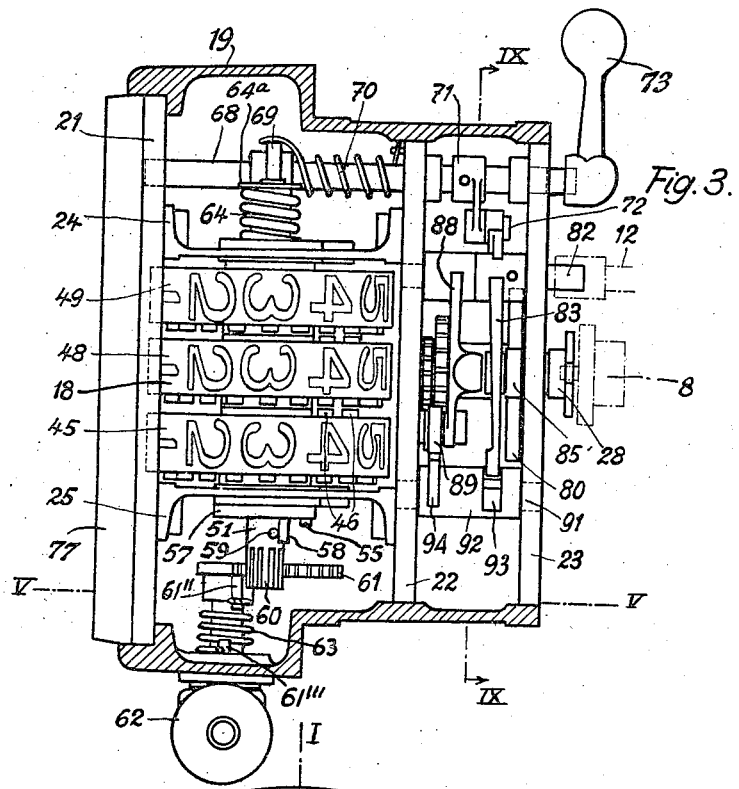
Fig. 3 is a sectional view taken on line III—III of Fig. 4.

Referring to the drawings, there is shown in Fig. 1 a volume meter 1 driven by the pressure of liquid admitted thereto and adapted to deliver one measuring unit during two revolutions thereof. This meter comprises two pairs of pistons 2 and 3 which drive the crank pin 4. The crank pin operates a distributing valve 5 arranged on a shaft 6 which carries a stop cam disc 7. The shaft 6 is provided with a plate 8 carrying a pin 9 adapted to engage a prong on a spider 28 which is attached to a shaft 29.

Figure 8:
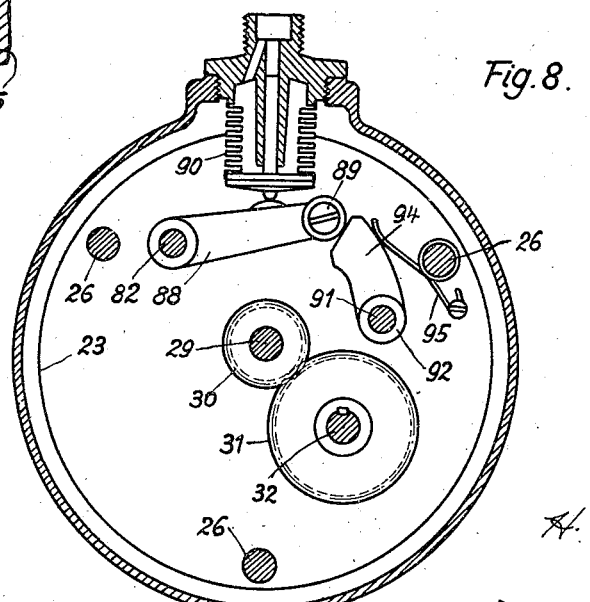
Fig. 8 is a sectional view taken on line VIII—VIII of Fig. 1.

The stop cam disc 7 is shown more clearly in Fig. 2 and the periphery is provided with a notch 10 adapted to be engaged by a pawl 11 secured to a countershaft 12 which also carries a lever 13 arranged to contact the stem of a spring controlled admission valve 14 of the liquid driving the meter. The valve 14 is located in a nipple 15 attached to the housing of the meter as shown in Fig. 1. The curved edge or periphery 10a of the disc 7 slants slightly towards the notch 10 as shown in Fig. 2 so as to cause a soft closing of the admission valve 14. The measured liquid is discharged through an opening provided in the neck 16. A connection between the countershaft 12 and a counter shown generally at 18 is established by a coupling 17. The counter 18 is enclosed in a housing 19 which may be attached to a casing as indicated at 20 and the housing is divided into two chambers by partition walls 21, 22, 23. The walls 21 and 22 are held together by brackets 24, 25, more clearly shown in Fig. 3 and by a stud 27 illustrated in Fig. 1 which has been provided for the purpose of possibly adding a setting device to the counter. Studs 26 shown in Figures 1 and 8 provide means for connecting the walls 22 and 23.

The drive of the counter is effected by the spider 28 which is engaged by the pin 9. The spider drives the shaft 29 which is operatively connected to rotate the indicator hand 37 shown in Figures 1 and 4 through a pinion 30 mounted on the shaft 29 which rotates a gear 31 and a pinion 33 fixed on the shaft 32. The indicator hand is mounted on a shaft 36 and the teeth of the gear 35 carried thereon are rotated by the pinion 33 through an intermediate pinion 34 so that the indicator hand is rotatably driven by the shaft 6. The transmission gear ratio is so arranged that a measured unit, such as one liter, is dispensed during one complete revolution of the indicator hand 37. The shaft 32 also carries a helical gear wheel 38 which meshes with a helical gear wheel 39 to drive the totalizing counter indicated at 40 in Fig. 4 which cannot be returned to zero and indicates the total quantity of liquid delivered.

Figure 6:
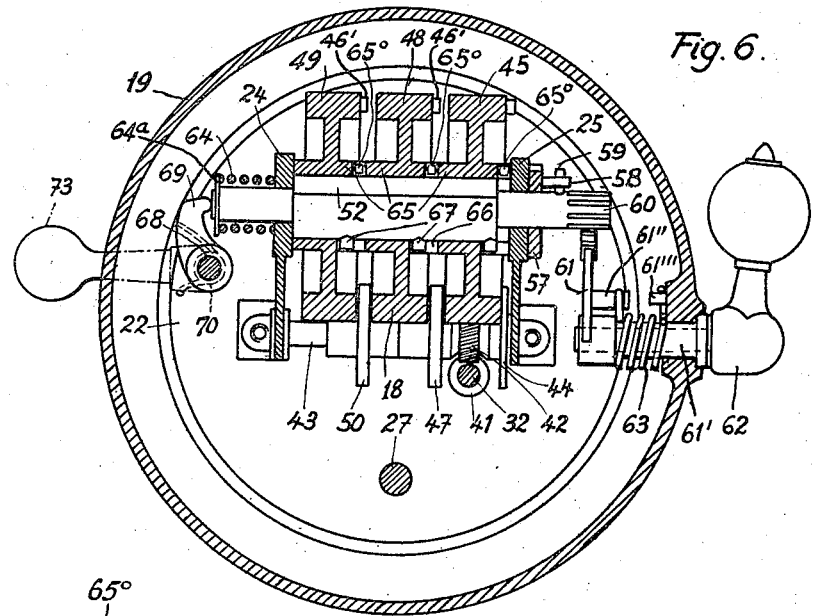
Fig. 6 is a sectional view taken on line VI—VI of Fig. 1.

A helical gear wheel 41 is provided to turn with the shaft 32 and drive a helical gear wheel 42 which is fixed on a shaft 43 as shown in Figures 1 and 6. A pinion 44 is provided on the shaft 43 for driving the drum 45 and the pinion 44 has only four teeth so that at every stop of the pinion 44 a gap is left which leaves a free passage for receiving the transfer pins of the drum 45. During each counting operation the pinion 44 makes a quarter turn and the teeth thereof will engage the transfer teeth of the drum 45 when moving in a forward direction. While the pinion 44 is rigidly fixed to the shaft 43 and is rather narrow and has only four teeth, the pinions 47 and 50 are twice as thick and these latter pinions are loose on the shaft 43 and the teeth thereof remain in constant mesh with the respective transfer teeth 46' (Fig. 6).

Therefore when the drum 45 completes its tenth revolution the two pins 46 on its back side strike the pinion 47 and rotate it one tenth of a revolution, and the drum 48 will be rotated one tenth of a complete revolution. During each revolution of the numeral drum 45 the two pins 46 engage the pinion 47 to thus turn the drum 48 in a known manner. The same operation takes place in connection with the numeral drum 49 by means of the pinion 50 and the numeral drum 48. Thus the delivered quantity of liquid will be marked in units, tens and hundreds of the units. The numeral drums 45, 48 and 49 turn on a shaft 51 provided with a groove 52 as shown in Figures 1 and 1a in which is adapted to be moved a pawl 53 by a spring 54. Such a spring controlled pawl is provided for each numeral drum 45, 48, 49.

Figure 4:
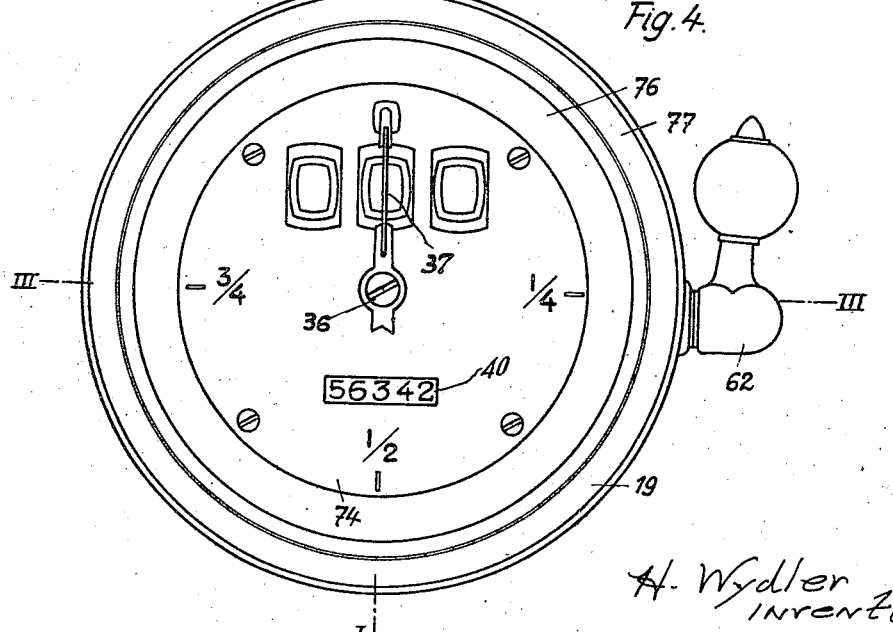
Fig. 4 is a plan view of the counter dial.

The means for returning the numeral wheels to zero includes a handle 62 operating by means of a shaft 61', a toothed segment 61 meshing with the toothed end 60 of the shaft 51 in combination with a disc 57 loosely mounted on the shaft 51 as shown in Figs. 3, 5 and 6. In these figures the apparatus is shown at rest and such a position is also illustrated in Fig. 4.

All rotary movement of the disc 57 on the shaft 51 is limited by means of a pin 55 secured to the bracket 25 extending into a gap formed in the disc. This disc carries a pin 58 which may be engaged by a pin 59 carried by the shaft 51. A torsional spring 63 with one end engaging a pin 61" of the segment and the other end bearing on a pin 61''' fixed to the housing tends to rotate the segment in a clockwise direction. When the segment 61 is moved in such a direction the shaft 51 will rotate in a counterclockwise direction, whereby the groove 52 shown in Fig. 1a will catch all the pawls 53 and bring thereby the zeros of the numeral drums in alignment or to the position shown in Fig. 4.

In returning the numeral drums to zero the segment 61 is first swung in a counterclockwise direction by means of the handle 62 so as to bring the groove 52 out of reach of all the pawls 53 and then when handle 62 is left free the spring 63 will return the segment into its position of rest which movement turns all the drums to the zero position. This position of rest is limited by the pin 55 which stops the disc 57 by engaging the edge 56 of the gap (Fig. 5). The other edge of the gap limits the counterclockwise movement of the handle 62 because by this movement the pin 59 will turn in a clockwise direction, pass the shorter pin 55 and after nearly a revolution catch the pin 58 and bring the edge 56' of the gap into contact with the pin 55. The gap serves thus to compensate for the thickness of pin 59.

According to Figs. 3 and 6 a compressed spring 64 is provided to bear on a disc 64a attached to the end of the shaft 51 and thus tend to displace this shaft in an axial direction to the left in Fig. 6 but such movement of the shaft 51 is counteracted by an arm 69 fixed to a cross shaft 68 which may be provided with a handle 73 for turning the shaft 68 manually.

Figure 7:
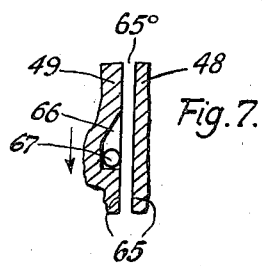
Fig. 7 is a detail sectional view of recesses in the hubs of two adjacent numeral carrying wheels of the counter.

According to Figs. 6 and 7 and with a view to help the zeroizing of the numeral drums 45, 48, 49 these drums are held between the brackets 24, 25 and in place on the shaft 51 separated from each other by the pinions 47 and 50. Each of the drums is provided in the right hand edge of its hub with a recess 66 having one sharp edge and one slanting edge as shown in Fig. 7. Each recess receives one of the pins 67 (Fig. 1a) of the shaft 51, the sharp edge being located in radially aligned relation with the zero of the respective drum. Annular spaces are provided between the hubs of the drums 48 and 49 and between the hubs of drums 45 and 48 and between the hub of the drum 45 and the bracket 25 so as to provide passageways for the pins 67 during the counting operation of the drums.

One complete turn of the indicator hand 37 on the dial 74 corresponds to one delivered unit. The hand 37 is protected by a glass 75 held in place by an annular element 76. The ring 77 serves to support the annular member 76 and may be used for a setting device.

Figure 9:
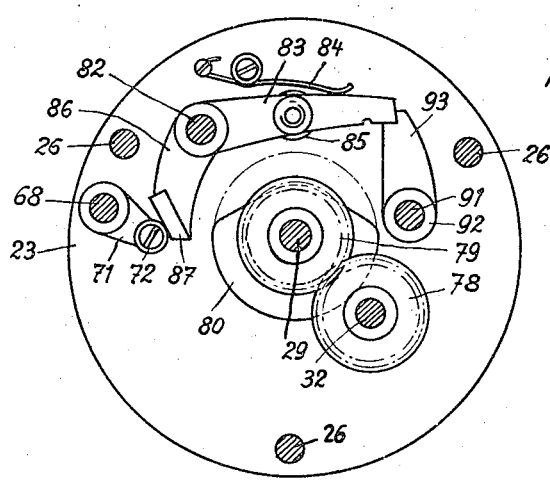
Fig. 9 is a sectional view taken on line IX—IX of Fig. 3.

On the shaft 32 of the driving mechanism of the counter a pinion 78 is provided in mesh with a pinion 79 as shown in Figs. 1 and 9. The sleeve 81 of the pinion 79 is secured to the shaft 29 driven by the meter, and carries a cam 80. In the partition walls 22 and 23 a shaft 82 is journalled to which is fastened a lever having two arms 83, 86. The arm 83 carries a roller 85 which is adapted to make contact with the cam 80 and the arm 86 is provided with an inclined abutment 87 adapted to cooperate with a roller 72 carried by an arm 71 fixed to the shaft 68.

As illustrated in Figs. 3 and 8 the shaft 82 carries an arm 88 which is in contact with a resilient corrugated tube 90 communicating through a connecting conduit 97 (Figs. 1 and 11) with the delivery pipe of the meter, and the end of the arm 88 is provided with a roller 89 in contact with an arm 94 controlled by a spring 95. The hub 92 of the arm 94 is attached to a shaft 91 and this shaft is provided with an arm 93 cooperating with the arm 83 of the two-armed lever shown in Fig. 9. The shaft 82 is coupled by means of a sleeve 17 to the shaft 12 (Fig. 1).

Figure 11:
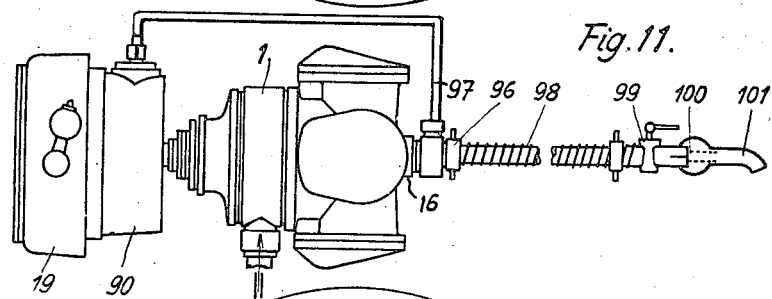
Fig. 11 is a general view of the assembled apparatus.

A hose union 96 is threaded to the discharge neck 16 and attached thereto is a hose 98, a delivery cock 99 with a spring controlled non-return valve 100 and the delivery spout 101 as shown in Figure 11. By means of the conduit 97 the delivery of the meter is in communication with the corrugated tube 90. When the delivery cock 99 is closed a rise of pressure will occur by the continued feeding of the liquid. This pressure is transmitted through the conduit 97 to the corrugated tube 90 which will press upon the lever arm 88. When the cock 99 is opened the pressure will diminish and the tube 90 will cease to press upon the lever arm 88.

The apparatus is operated as follows:

If the counter 18 for the single deliveries or the numeral drums 45, 48, 49 and the indicator hand 37 are at the zero positions the shaft 51 is in the position shown in Fig. 6. The lever 69 likewise is in its extreme position to the left. The arm 71 is thus turned by the shaft 68 against the abutment 87 whereby the arm 83 assumes the position shown in Fig. 9. The shaft 82 is thus rotated and the coupling 17 causes the shaft 12 to turn. Then the pawl 11 is withdrawn from engagement with the disc 7. The valve 14 is caused to open by the lever 13 and the admission of liquid into the meter may take place. In other words the position of the parts 10 to 14 will be opposite to that shown in Fig. 2 where the valve 14 is illustrated in the closed position and the pawl 11 in the locking position.

Figure 10:
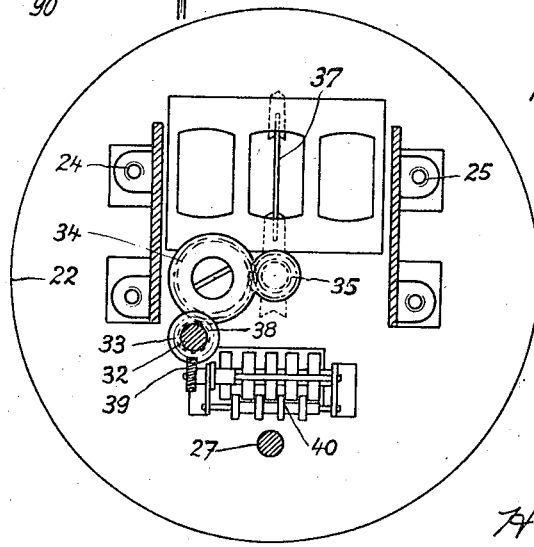
Fig. 10 is a sectional view taken on line X—X of Fig. 1.

If the admitted liquid is under pressure, the shaft 6 will rotate if cock 99 is opened and the liquid will in a known manner be discharged. The liquid passes the pistons 2 and 3 through the distributing valve 5 and through the inside of the meter into the discharge neck 16 and from there through the hose 98, the cock 99 after the opening of the non-return valve 100 through the spout 101 to the outside. Turning of the shaft 6 will cause the shaft 29 to be rotated by means of the coupling members 8, 28 and the pin 9. The wheel 30 will thus rotate and drive the shaft 32 by means of the gear 31 and the pinions 33, 34 and 35 are driven by the shaft 32 (Figs. 1 and 10) and the indicator hand is also moved.

The ratio of transmission between one turn of the hand 37 and the number of revolution of the meter is chosen with a view of having one turn of the hand 37 corresponding to one measuring unit, such as one liter. The hand 37 cannot be moved backwards because it is after the delivery of every unit always in the zero position and the pawl 11 locks the meter by moving into the recess 10. The shaft 32 by means of helical wheels 38, 39 drives the counter 40 which counts the total delivered quantity in units. This counter serves as a totalizing counter and is of any well known construction.

The shaft 32 (Fig. 1) drives the shaft 43 through the two helical wheels 41 and 42 and a pinion 44 attached to the shaft 43 meshes with the pins of the numeral drum 45. The transmission ratio of this drive is similar to that of the hand indicator 37 so that ten turns of the hand 37 or ten units of the delivered liquid causes the pinion 44 to rotate the numeral drum 45 one complete revolution. After one revolution of the numeral drum 45 the pinion 47 will be moved forward one step by the teeth 46 (Fig. 3) of the drum 45. Since the pinion 47 meshes with the teeth of the numeral drum 48 this drum after one complete turn of the numeral drum 45 will advance one step in such a way that at the measuring of ten units the numeral drum 48 will advance one number. The same ratio exists between the drum 49 and the drum 48. After one revolution of the drum 48 the drum 49 will be moved one step. Thus the units, tens and hundreds of the delivered fluid units are recorded. By the rotating of the numeral drums the shaft 51 is moved axially to the right (Fig. 6) since the pins 67 of shaft 51 are displaced by the taper of the recesses 66 (Fig. 7) on the hubs 65. The taper of the recess 66 is designed to permit the unrestrained rotation of the numeral drums during their counting operation and the right angle edge of recess 66 located in radial alignment with the zero position of the respective drum is designed to carry the drums along with the shaft 51 when this shaft is rotated in a counterclockwise direction or when the counter is returned to zero. During the counting operation the shaft 51 will be displaced to the right because the pins are then sliding along the unapertured part of each hub or in space 65°. Only when the zero point is passed will the shaft 51 temporarily slip back so that the pins 67 enter the recesses 66. Simultaneously the pawls 53 slip over the groove 52 and remain in contact with the peripheral surface of shaft 51.

During displacement of the shaft 51 the arm 69 is swung to the right or in a clockwise direction (Fig. 6) by the spring 70 and to thus turn the shaft 68 and the arm 71 (Fig. 9) so that the abutment 87 will no longer engage the roller 72. Thus arm 83 will be moved into engagement with the arm 93 under the action of the spring 84. The pinion 78 which is attached to the shaft 32 moves the pinion 79 and thereby the cam disc 80. Every full turn of the cam disc 80 corresponds to a unit of the measured quantity.

If the delivery of liquid is stopped by closing the cock 99 the meter is stopped and owing to the rise of pressure caused by liquid the pressure in the conduit 97 expands the corrugated tube 90 which presses upon the arm 88. Thereby the roller 89 pushes the arm 94 to the right or in a clockwise direction (Fig. 8) and moves the arm 93 out of engagement with the arm 83 since the arm 93 is also fixed to the shaft 91. The arm 83 is then free and the roller 85 touches the cam disc 80.

When the cock 99 is opened again the cam disc 80 will be rotated together with the counter and the indicator hand 37. While the cam disc 80 rotates, the roller 85 will advance into the gap of the disc. Thus the shaft 82 will be rotated and revolve the shaft 12 and move the pawl 11. The pawl 11 can now drop upon the stop cam disc 7 (Fig. 2) and since the arm 13 is moved with the pawl 11, the admission valve 14, while the stop cam rotates, will gradually be closed until pawl 11 drops into the recess 10 and stops the meter.

The stop cam disc 7 is so arranged with respect to the cam disc 80 that the gap of the disc 80 coincides approximately with the notch 10 in the stop cam disc 7. The meter will be locked in the described manner and always in the same position. The liquid feed will be stopped and since no liquid is fed the non-return valve 100 in the delivery neck 101 will close automatically. In the described manner the exact completing of an already started unit is secured and the hand 37 will be in the zero position after the delivery of such unit.

If it is desired to withdraw a new liquid supply from the meter it is necessary first to return the numeral drums to zero which may be accomplished as set forth hereinabove. In the zero position the spring 64 presses the pins 67 back into the recesses 66 in the hubs 65 so that the shaft 51 slides back into its initial position to the left (Fig. 6), pushes back the arm 69 and thus turns the shaft 12 and lifts the pawl 11 out of the recess of stop cam disc 7. The admission valve is opened by the arm 13 and admission of liquid into the meter is rendered possible. Movement of the arm 69 causes turning of the shaft 68 and the arm 71 with the roller 72 are moved and the roller 72 presses upon the abutment 87 of the arm 86. The double arm lever turns in a counterclockwise direction and lifts the arm 83 so that the spring controlled lever 94 can again move into engagement with the roller 89 since the corrugated tube 90 owing to the opening of the delivery cock and to the release of the pressure has again contracted. Such movement of the lever 94 rotates the shaft 91 and the arm 93 again engages the arm 83 and holds the roller 85 from moving into engagement with the cam disc 80.

A handle 73 may be provided on the shaft 68 for manually rotating the shaft.

What I claim is:

1. In liquid dispensing apparatus, an axially movable shaft, a numeral drum rotatably mounted on said shaft adapted to be rotated when liquid is dispensed, means for preventing lateral movement of said drum, yieldable means for moving said shaft in one axial direction when the drum is in a given rotated position on said shaft, a valve for admitting dispensable liquid to the apparatus, means operably responsive to the axial movement of the shaft in said direction for opening said valve, and means associated with said shaft and the drum adapted to move the shaft axially in an opposite direction upon initial rotation of said drum whereby said third mentioned means is rendered inoperative until said drum is rotated to said given position.

2. In liquid dispensing apparatus, an axially movable shaft, at least one numeral drum rotatably mounted on said shaft adapted to be rotated when liquid is dispensed, means for preventing lateral movement of said drum, a pin projecting radially from said shaft, said drum having a recess therein adjacent the shaft, a spring for moving said shaft in an axial direction and move the pin into said recess, a valve for admitting dispensable fluid to the apparatus, means operably responsive to said axial movement of the shaft for opening said valve, and said recess having a sloping surface adapted to engage said pin upon rotation of the drum and move the shaft in an opposite axial direction whereby said second mentioned means is rendered inoperative.

3. In liquid dispensing apparatus, an axially movable shaft, at least one numeral drum rotatably mounted on said shaft adapted to be rotated when liquid is dispensed, means for preventing lateral movement of said drum, a pin projecting radially from said shaft, said drum having a recess therein adjacent the shaft, a spring for moving said shaft in an axial direction and move the pin into said recess, a valve for admitting dispensable fluid to the apparatus, means operably responsive to said axial movement of the shaft for opening said valve, said recess having a sloping surface adapted to engage said pin upon rotation of the drum and move the shaft in an opposite axial direction, and said drum having a circumferentially extending hub portion for maintaining the shaft in the last mentioned axial position during one revolution whereby said second mentioned means is rendered inoperative during a partial revolution of the drum.

4. In liquid dispensing apparatus, an axially movable shaft, a plurality of numeral drums rotatably mounted on said shaft in a spaced relation adjacent each other, one of said drums being adapted to be rotated when liquid is dispensed and after one revolution rotate the adjacent drum, means for preventing lateral movement of the drums, each drum having a recess in the hub portion thereof, a pin projecting from the periphery of the shaft adjacent the hub portion of each drum, a spring for moving the shaft in an axial direction and move the pins in the respective recesses, a valve for admitting dispensable liquid to the apparatus, means operably responsive to axial movement of the shaft for opening said valve, each recess having an inclined surface adapted to engage the respective pin upon rotation of the drum and move the shaft in an opposite axial direction, so as to render said second mentioned means inoperative, and the hub of each drum having a straight lateral face whereby the shaft is maintained in the last mentioned axial position by the straight lateral face of one drum during one revolution thereof and the shaft is held in such an axial position by rotation of the second drum when the recess of the first drum is aligned with the pin associated therewith.

5. In liquid dispensing apparatus, an axially movable shaft, at least one numeral drum rotatably mounted on said shaft adapted to be rotated when liquid is dispensed, means for preventing lateral movement of said drum, yieldable means associated with one end of the shaft for moving it in an axial direction when the drum is in a given rotated position on the shaft, a second shaft arranged transverse to the first shaft, means for rotating the second shaft in response to the axial movement of the first shaft, a valve for admitting dispensable liquid to the apparatus, and means operably responsive to the rotation of the second shaft for opening said valve, and means associated with the first shaft and the drum adapted to move the first shaft axially in an opposite direction upon rotation of the drum whereby the second mentioned shaft is rotated in an opposite direction.

6. In liquid dispensing apparatus, an axially movable shaft, at least one numeral drum rotatably mounted on said shaft adapted to be rotated when liquid is dispensed, means for preventing lateral movement of said drum, yieldable means associated with one end of the shaft for moving it in an axial direction when the drum is in a given rotated position on the shaft, a second shaft arranged transverse to the first shaft, means for rotating the second shaft in response to the axial movement of the first shaft, a valve for admitting dispensable liquid to the apparatus, a third shaft adapted to open the valve upon rotation arranged along said second shaft, means carried by the second shaft adapted to turn the third shaft, a pin carried by the first shaft, and cam means carried by the drum adapted to engage the pin and move the first shaft in an opposite axial direction upon rotation of the drum whereby the means for turning the third shaft is rendered inoperative to open the valve.

HERMANN WYDLER.